(12) United States Patent  
Reitmann et al.

(10) Patent No.: US 9,234,813 B2  
(45) Date of Patent: Jan. 12, 2016

(54) METHOD AND AN ARRANGEMENT FOR PURPOSES OF DETERMINING AN INCIDENCE OF LOADING OF AN AIRCRAFT STRUCTURE

(75) Inventors: Joerg Reitmann, Harsefeld (DE); Rene Meissner, Berlin (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 13/881,511

(22) PCT Filed: Sep. 27, 2011

(86) PCT No.: PCT/EP2011/066793  
§ 371 (c)(1),  
(2), (4) Date: Apr. 25, 2013

(87) PCT Pub. No.: WO2012/055663  
PCT Pub. Date: May 3, 2012

(65) Prior Publication Data  
US 2013/0213141 A1  Aug. 22, 2013

Related U.S. Application Data

(60) Provisional application No. 61/406,613, filed on Oct. 26, 2010.

(30) Foreign Application Priority Data

Oct. 26, 2010  (DE) .......................... 10 2010 042 956

(51) Int. Cl.  
*G01L 1/24* (2006.01)  
*G01M 5/00* (2006.01)  
(Continued)

(52) U.S. Cl.  
CPC .................. *G01M 5/00* (2013.01); *G01B 11/16* (2013.01); *G01M 5/0041* (2013.01); *G01M 5/0091* (2013.01); *B64D 2045/0085* (2013.01)

(58) Field of Classification Search  
CPC ........... B64D 2045/0085; B64D 45/00; B64D 47/08; B64D 47/00; B64D 43/00; G01B 11/16; G01M 5/00; G01M 5/0091; G01M 5/0041; G01M 11/081; H04N 7/18; G08G 5/0021; G08G 5/065; G08G 5/0078; G01S 17/026; G01S 17/933; G01S 17/87; G01S 17/023  
USPC ......... 73/800, 760, 178 R; 340/945; 348/148, 348/159; 356/35.5  
See application file for complete search history.

(56) References Cited

U.S. PATENT DOCUMENTS

| | | |
|---|---|---|
| 4,816,828 A | 3/1989 | Feher |
| 5,283,643 A | 2/1994 | Fujimoto |

(Continued)

FOREIGN PATENT DOCUMENTS

| | | |
|---|---|---|
| CN | 101484360 | 7/2009 |
| WO | 2005050601 | 6/2005 |

(Continued)

OTHER PUBLICATIONS

International Preliminary Report, May 10, 2013.

(Continued)

*Primary Examiner* — Lisa Caputo  
*Assistant Examiner* — Brandi N Hopkins  
(74) *Attorney, Agent, or Firm* — Greer, Burns & Crain, Ltd.

(57) ABSTRACT

A method and an arrangement to determine an incidence of loading of an aircraft structure. A true reality of at least one aircraft structural section is superposed with the virtual reality of the aircraft structural section, and any deviation is established by means of a comparison of the two realities; this deviation is evaluated with reference to its consequences in terms of the structural mechanics involved.

7 Claims, 7 Drawing Sheets

(51) Int. Cl.
   *G01B 11/16*   (2006.01)
   *B64D 45/00*   (2006.01)

(56) References Cited

U.S. PATENT DOCUMENTS

| | | |
|---|---|---|
| 5,798,458 A | 8/1998 | Monroe |
| 6,118,401 A | 9/2000 | Tognazzini |
| 2005/0098681 A1 | 5/2005 | Berson et al. |
| 2009/0309762 A1 | 12/2009 | Woelcken et al. |

FOREIGN PATENT DOCUMENTS

| | | |
|---|---|---|
| WO | 2008003546 | 1/2008 |
| WO | 2009075648 | 6/2009 |

OTHER PUBLICATIONS

Chinese Search Report, Sep. 2, 2014.
German Search Report, Oct. 26, 2010.

# METHOD AND AN ARRANGEMENT FOR PURPOSES OF DETERMINING AN INCIDENCE OF LOADING OF AN AIRCRAFT STRUCTURE

CROSS-REFERENCES TO RELATED APPLICATIONS

This application claims the benefit of the U.S. Provisional Application No. 61/406,613, filed on Oct. 26, 2010, and of the German patent application No. 10 2010 042 956.2 filed on Oct. 26, 2010, the entire disclosures of which are incorporated herein by way of reference.

BACKGROUND OF THE INVENTION

The invention concerns a method and an arrangement for purposes of determining an incidence of loading of an aircraft structure.

In the case of aircraft the registration and archiving of all incidences of damage and overload that an aircraft experiences during its service life, for example in the region of its structure, is prescribed for safety reasons. These incidences of damage occur in particular on the runway during fuelling, loading and unloading, and while maneuvering, and take place for example, as a result of collisions with freight containers or with towing vehicles. They also occur as a result of incidences of overload in all phases of flight, in particular in the case of so-called hard landings.

In the case of aircraft of metal construction an incidence of damage can be registered by means of a visual inspection. In the case of aircraft of fibre composite construction, on the other hand, incidences of damage often only appear as internal delaminations, which cannot be discerned externally, or only with difficulty. A solution of known art therefore proposes that the regions of the aircraft structure that are very likely to be damaged, such as the freight door region, for example, are to be provided with a sensor field consisting of a multiplicity of electrical sensors. However, this solution has the disadvantage that each of the sensors can only monitor a narrowly defined region, so that any incidences of damage that occur outside this region are not registered. Moreover the sensors, and in particular their cabling, result in a high aircraft weight and signify a high level of additional installation and assembly effort. Furthermore, as a result of the high number of components the tendency is for the reliability to reduce and the number of false reports to increase.

SUMMARY OF THE INVENTION

The object of the present invention is to create a method for purposes of determining at least one incidence of loading of an aircraft structure, which removes the above-cited disadvantages and allows monitoring of the aircraft structure over a large area, as well as an arrangement for purposes of executing a method of this type.

In an inventive method for purposes of determining at least one incidence of loading of an aircraft structure at least one section of the aircraft structure is optically registered. The "actual" state is then compared with a stored "design" state (target state) for the aircraft structural section. Finally, on the basis of a "design"-"actual" comparison a structural mechanics assessment is conducted as to whether an incidence of overload of at least part of an aircraft structural section has occurred.

The inventive method allows an indirect determination of damage and thus reliable monitoring over a large area of at least one section of the aircraft structure. Optical monitoring, in contrast to the prescribed direct determination of damage of known art, is not just limited to individual local structural regions at particular times; rather the aircraft can be globally observed, both in flight and also on the runway, and any incidences of overload can then be locally determined. A plurality of forms of loading, such as compressive forces, tensile forces, and moments, can be determined at the same time. Here both at least one temporary incidence of overload and also a cumulative overload are determined. A temporary incidence of loading is here understood to be an individual event, which causes immediate damage. Cumulative overloading signifies fatigue damage, which is built up as a result of a summation of minor events, each of which does not individually represent an overload. Moreover, based on the calculated overload the necessary repair and maintenance task schedules can be issued, so that the downtime of the aircraft is reduced compared with conventional solutions. By the registration in particular of in-flight, take-off and landing loads the aircraft structure can be optimally dimensioned, which results in a saving in weight and cost, and also in an extended service life.

In a preferred example of embodiment a digitised model of the aircraft structural section is used as the "design" state, and a real model is compiled on the basis of the optical data registered as the "actual" state. A so-called true reality is superposed with a virtual reality and by means of a comparison of the two realities any deviation is established, which is evaluated with regard to its consequences in terms of the structural mechanics. Data for the virtual model of the aircraft are already available in the form of digitised mathematical models, so that access can be made to a data resource that already exists and moreover has been checked. At the same time any modifications to the data resource are also registered, so that the "design" state is always compiled on the basis of current data.

As a supplement to the optical registration an acoustic registration of the aircraft structural section and/or of its environment can also take place by means of acoustic sensors. The acoustic sensors allow exact acoustic detection and the compilation of an "actual" acoustic image, which can be compared with a "design" acoustic image. The acoustic registration serves in particular to determine a start signal for archiving and evaluation. If in the course of the acoustic comparison, a sufficient deviation between the images and/or an alien noise occurs, it is concluded that a structural loading incident has occurred, and an optical "design"-"actual" comparison takes place. In particular, not only short-term storage is carried out, for example for an in-flight phase, such as takeoff and landing and/or a ground stop, but also long-term archiving of the optical data for purposes of assessment. By this means the quantity of data is significantly reduced compared with a process of unfiltered storage and archiving.

In order also to be able subsequently to assign a causal entity to the loading incident, it is advantageous if the time of occurrence of the loading incident is registered.

In one example of embodiment a velocity and/or acceleration, and also the distance separating an alien object from the target object, i.e. the aircraft, are determined with the aid of the digitised recordings, so that with the knowledge of these two parameters any hazard to the target object can be predicted and ranked. In this respect the parameters such as velocity, acceleration, separation distance, and/or direction are not measured directly in this example of embodiment, but rather indirectly by evaluation of the optical data, for example, with the use of mathematical models. In addition if the separation distance of the alien object is sufficient it may still be possible for countermeasures to be introduced and for a collision and/or an impact with the aircraft to be prevented or lessened.

An inventive arrangement for purposes of executing an indirect method of this type has an optical registration system, for example with at least one camera, one laser unit, and similar, for purposes of registering at least one section of the aircraft structure, and an evaluation system for purposes of identifying an overload of at least of one part of the aircraft structural section on the basis of the data of the registration systems.

With an appropriate choice of objective the at least one camera allows registration of a large area of the structure and in addition of the environment without complex open-loop or closed-loop control technology. In the case of modern aircraft access can be made to already installed cameras such as in the vertical tail unit or in the undercarriage region, so that, depending upon the structural section to be observed, no additional cameras may be necessary. The camera installed in the elevator unit, for example, allows the recording of the wing loads in flight or on the runway.

The optical registration and in particular the comparison of the digitised model with the reality, and thus its evaluation, is made easier if the monitored aircraft structural section is provided with optical markings, which for example identify an object, such as a vehicle, for purposes of determining the vehicle weight, a starting position and/or datum position, and/or optical tolerance limits.

In one example of embodiment the arrangement also has an acoustic registration system for purposes of acoustic registration of the aircraft structural section and/or its environment and the loading incident. For purposes of evaluation of the "actual" acoustic image, "design" acoustic images are preferably stored in the evaluation system.

For purposes of an assignment and/or indexing of the time of the loading incident a time registration system can be provided, by means of which, for example, a causal entity can be assigned to an incidence of damage.

Other advantageous examples of embodiment of the invention are the subject of other subsidiary claims.

BRIEF DESCRIPTION OF THE DRAWINGS

In what follows preferred examples of embodiment of the invention are elucidated in more detail with the aid of highly simplified schematic representations. Here.

DETAILED DESCRIPTION OF THE PREFERRED EMBODIMENTS

Figure 1:
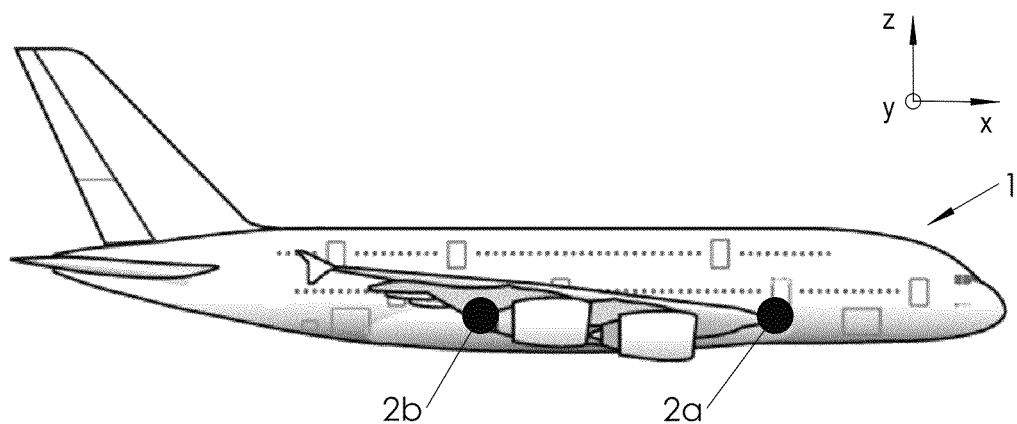
FIGS. 1 and 2 show a first example of embodiment of an inventive arrangement.
Figure 2:
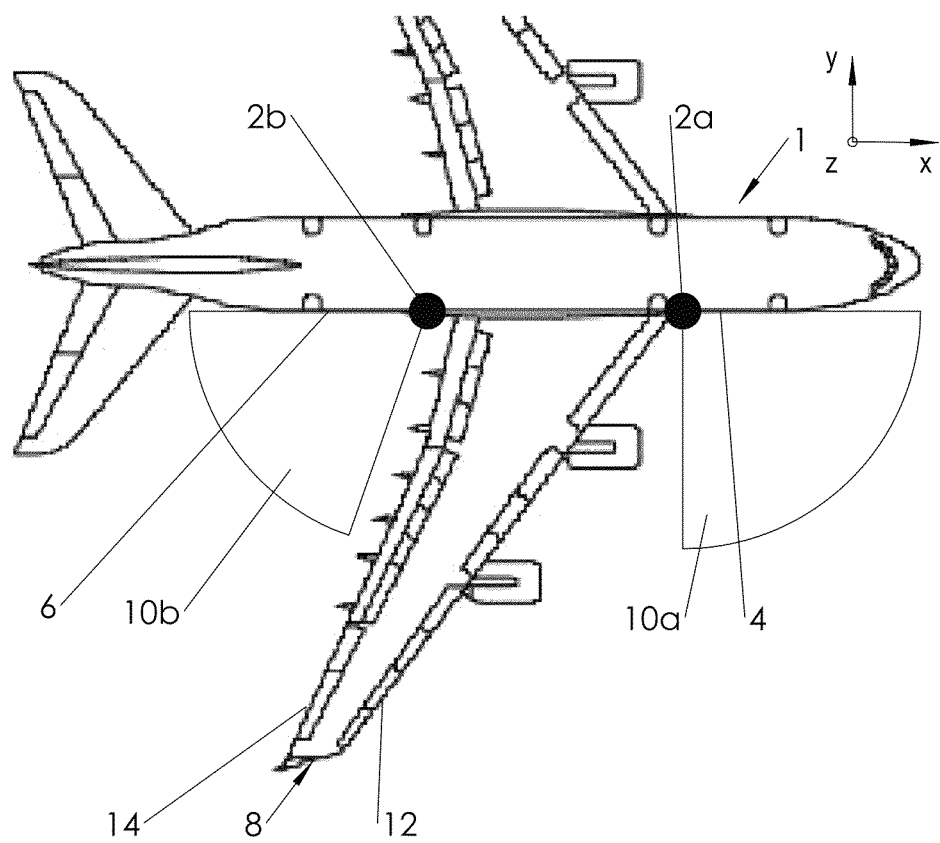

In accordance with FIGS. 1 and 2 a first inventive example of embodiment of an arrangement for purposes of determining an incidence of loading of a structure of an aircraft 1 has at least one optical registration system on the starboard side; this system has at least two cameras 2a, 2b, in each case for purposes of optical registration of an aircraft structural section 4, 6 and an environment surrounding the aircraft structural section, for purposes of compiling an "actual" state, i.e. a real model, of the aircraft structural section.

The optical cameras 2a, 2b are positioned at the leading and trailing edges of the root region of a wing 8 on the starboard side of the aircraft 1.

The leading edge camera 2a is oriented in the flight direction, i.e. the aircraft longitudinal direction. It defines a 3-dimensional registration region 10a, which extends between a lateral fuselage section 4 near the cockpit and, for example, the leading edge 12 of the wing 8.

The trailing edge camera 2b is oriented in the direction of the rear fuselage, i.e. in the direction of the tail unit, and defines a 3-dimensional registration region 10b, which extends between a lateral fuselage section 6 near the tail unit and the trailing edge 14. Thus the cameras 2a, 2b allow an optical registration of the environment in the flight direction in front of and behind the starboard wing 8 and the corresponding lateral fuselage sections 4, 6.

Figure 3:
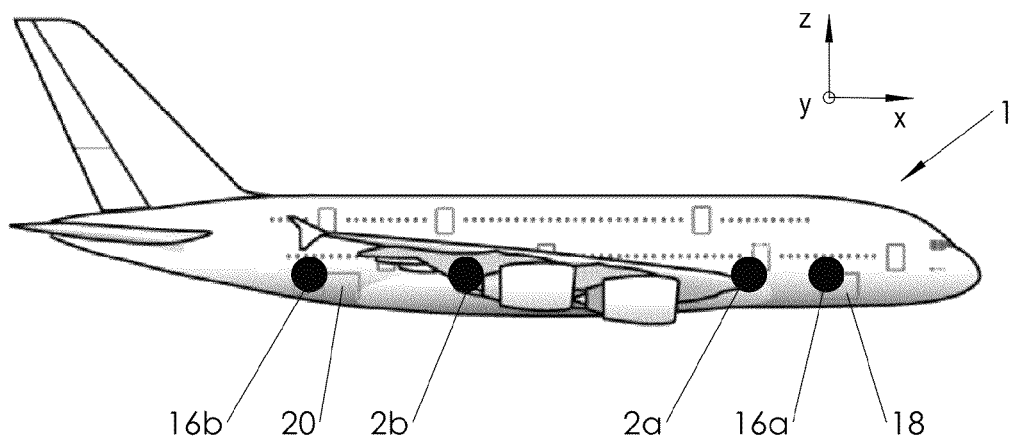
FIGS. 3 and 4 show a second example of embodiment of an inventive arrangement.
Figure 4:
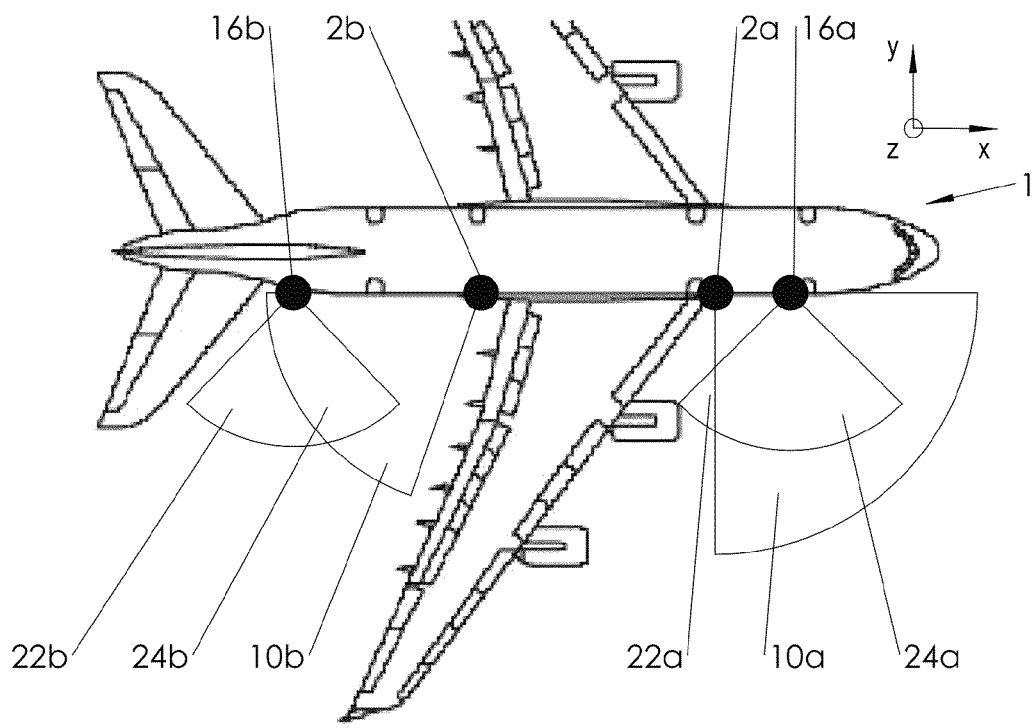

In accordance with FIGS. 3 and 4 a second inventive example of embodiment of an arrangement for purposes of determining an incidence of loading of a structure of an aircraft 1 has at least one starboard-side optical registration system, which in addition to the two cameras 2a, 2b in the root region of the wing 8 provides an optical camera 16a, 16b in the region of each of the freight doors 18, 20.

The optical cameras 16a, 16b in the region of the freight doors 18, 20 enable a more detailed registration of movements in the region of the freight doors 18, 20 than the wing root cameras 2a, 2b, so that, for example, incidences of damage in the freight door frame region can be optically registered accurately. They define in each case a 3-dimensional registration region 22a, 22b, which extends from the aircraft 1 in the shape of a cone and forms an overlapping section 24a, 24b with the registration regions 10a, 10b of cameras 2a, 2b.

Figure 5:
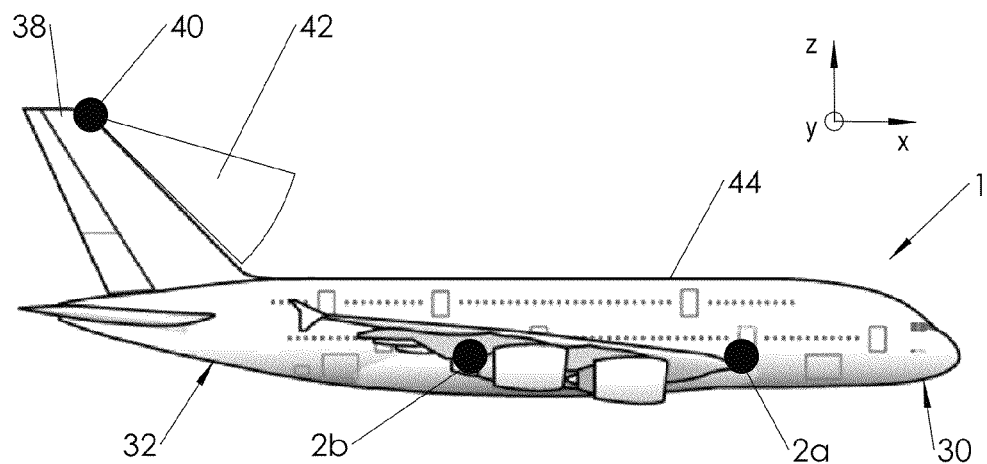
FIGS. 5 and 6 show a third example of embodiment of an inventive arrangement.
Figure 6:
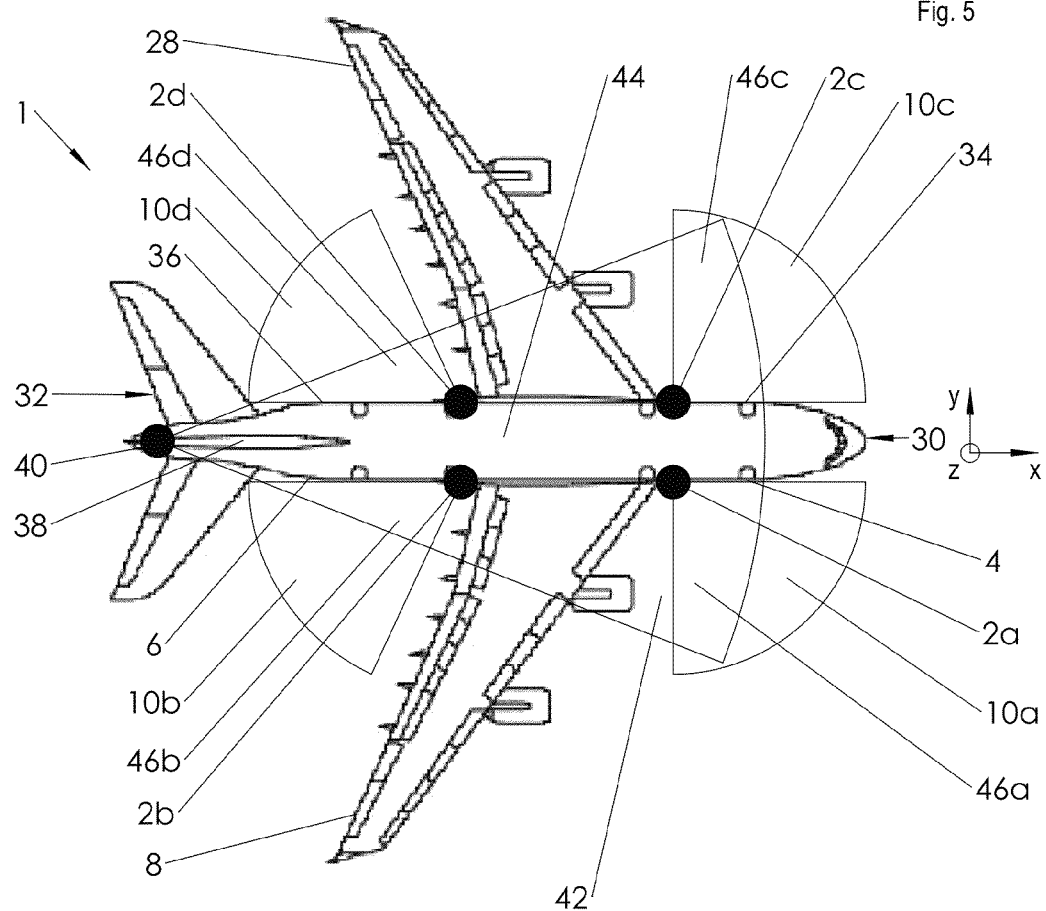

In accordance with FIGS. 5 and 6 a third inventive example of embodiment of an arrangement for purposes of determining an incidence of loading of a structure of an aircraft 1 has an optical registration system, which on both the starboard and port sides provides a leading edge and a trailing edge optical camera 2a, 2b, 2c, 2d in the region of the wing roots, each of which cameras images a registration region 10a, 10b, 10c, 10d such that an environment between the wings 8, 28 and the cockpit, i.e. nose of the aircraft 30, and between the wings 8, 28 and the tail unit, i.e. rear fuselage 32, respectively, is optically registered 3-dimensionally. In addition the lateral fuselage sections 4, 6, 34, 36 between the nose of the aircraft 30 and the wings 8, 28, and between the wings 8, 28 and the rear of the aircraft 32, are also optically registered.

Moreover an optical camera 40 is positioned in the leading edge region at the tip of the vertical tail unit 38. The camera 40 is oriented in the direction of the cockpit 30, and defines an optical registration region 42, which opens up 3-dimensionally in the shape of a cone from the tail unit 32 in the direction of the cockpit 30. In this manner the fuselage 44, and at least the root regions of the wings 8, 28, as well as the environment of the aircraft 1, are registered in a bird's eye view. The cone-shaped registration region 42 in each case forms an overlap section 46a, 46b, 46c, 46d with the other registration regions 10a, 10b, 10c, 10d.

The optical registration region 42 of the tail unit camera 40 can also be opened up in the shape of a cone such that it records the full width of the aircraft across the wing tips, so that this camera 40 enables, for example, a registration of the loadings on the wings 8, 28 in flight or on the runway.

Figure 7:
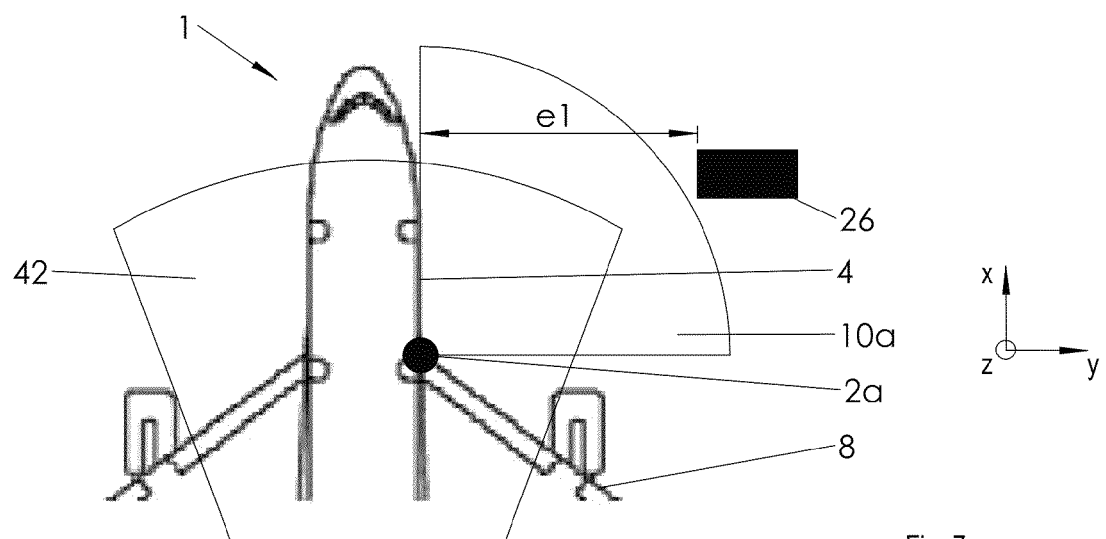
FIGS. 7, 8 and 9 show an example of embodiment of an inventive method with a determination of separation distance.
Figure 8:
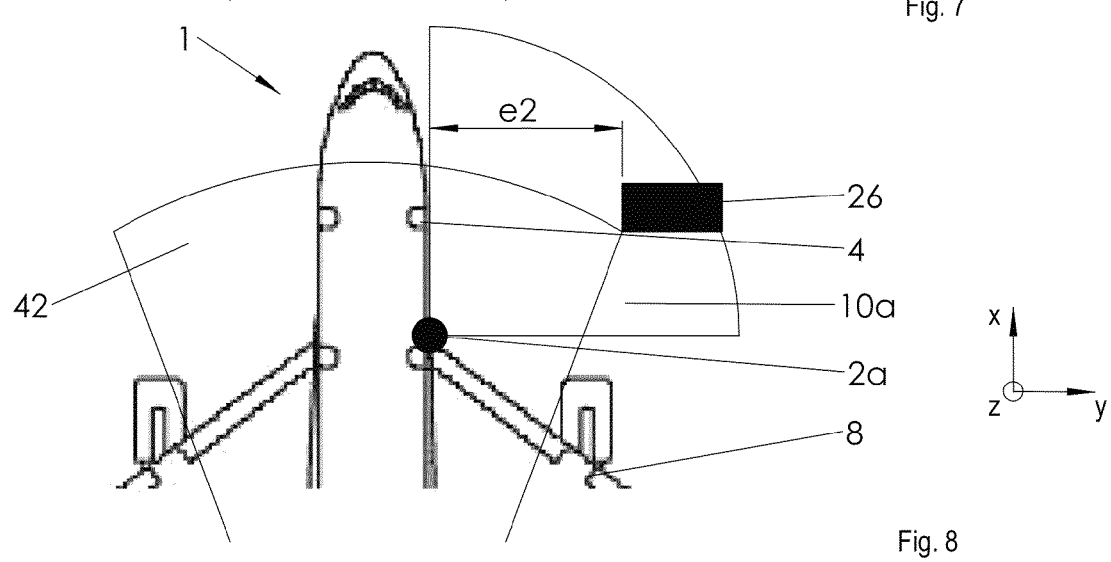
Figure 9:
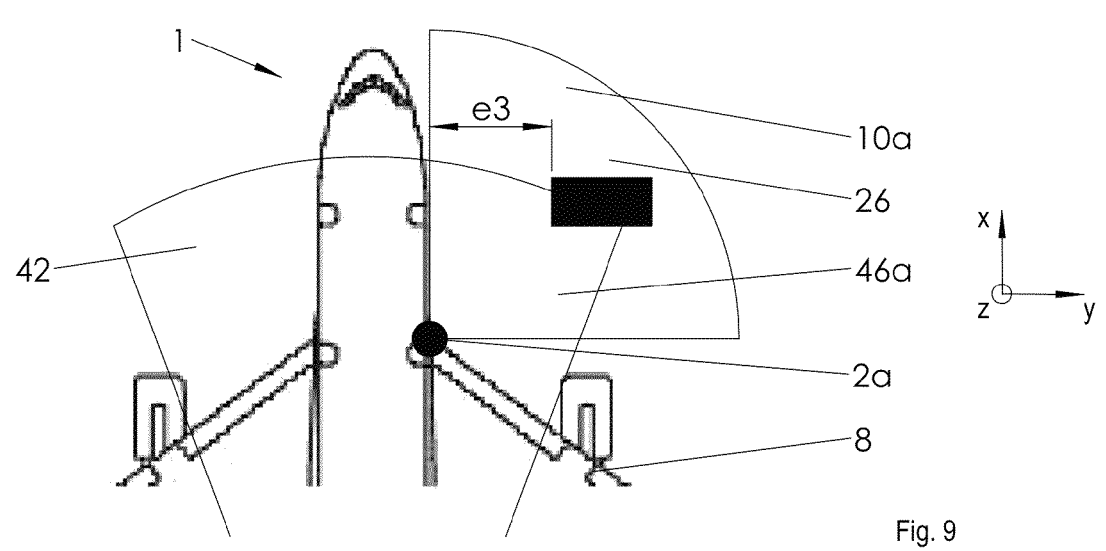

FIGS. 7, 8 and 9 indicate a determination of separation distance, i.e. an indirect measurement of separation distance, by means of the inventive arrangement in accordance with FIGS. 5 and 6, for a vehicle 26 or an alien object that is approaching a starboard region of the aircraft 1 between the cockpit 30 and the wing 8 in the transverse direction of the aircraft 1 or target object.

The vehicle 26 shown in FIG. 7, for example, a loading vehicle or a fuel tanker, is located outside the registration region 10a of the leading edge camera 2a and outside the registration region 42 of the tail unit camera 40. Thus the vehicle 26 is located at a sub-critical separation distance e1 from the aircraft 1.

If on the other hand, the vehicle 26, as shown in FIG. 8, approaches the aircraft 1, and/or a reduction of the separation distance between the vehicle 26 and the aircraft 1 is determined by an evaluation of the optical data with the application of mathematical models, and it thereby enters the registration region 10a of the leading edge camera 2a, the vehicle 26 is located at a critical separation distance e2 from the aircraft 1 and an evaluation system, not shown, assesses whether a potential hazard exists for the aircraft 1. For this purpose the vehicle 26 is fitted with markings, with the aid of which it is identified. An automatic check is then performed on the basis of stored service data as to whether the identified vehicle 26 is authorised to be present in the registration region 10a or whether it represents a potential hazard for the aircraft 1. The vehicle 26 represents, for example, a potential hazard if it is located in the registration region 10a without authorisation.

If the vehicle 26, as shown in FIG. 9, continues to approach the aircraft 1 and thereby enters the registration region 42 of the tail unit camera 40 and thus enters the overlap region 46a of the two cameras 2a, 40, it is now located at a super-critical separation distance e3 from the fuselage side section 4, so that, depending upon the preceding assessment of the vehicle, it is either considered to be necessary and non-hazardous, or to be a hazard. If it is considered to be a hazard a recording of the registered "actual" data starts, and measures are indicated for lessening the damage and/or hazard, such as an audio signal.

Figure 10:
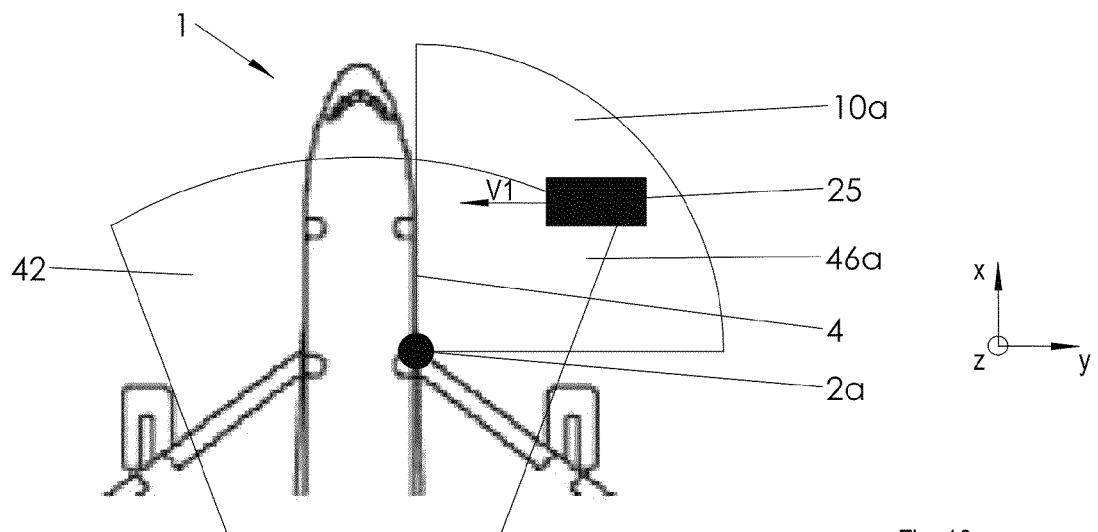
FIGS. 10, 11 and 12 show an example of embodiment of an inventive method with a determination of velocity.
Figure 11:
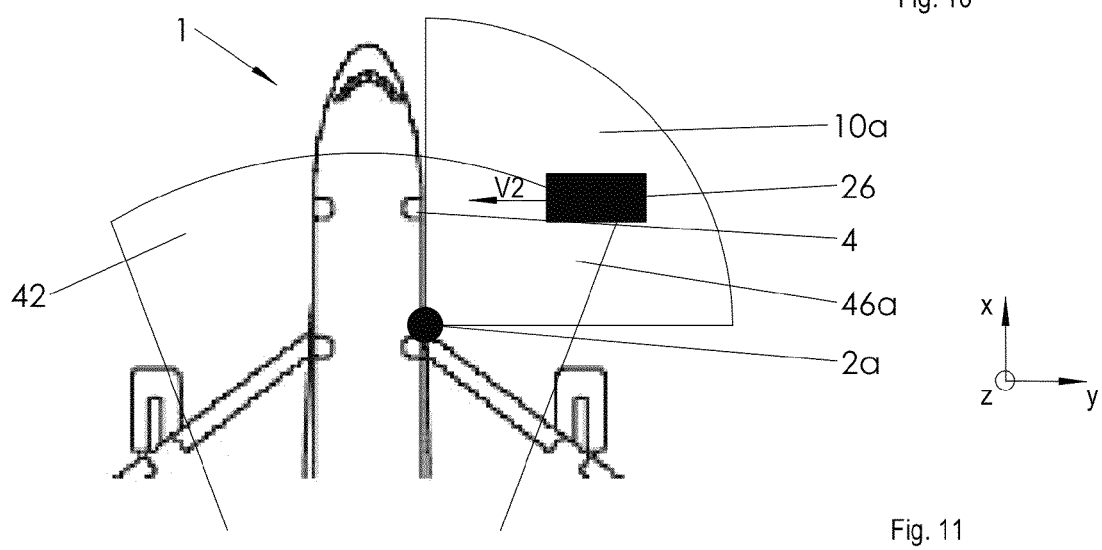
Figure 12:
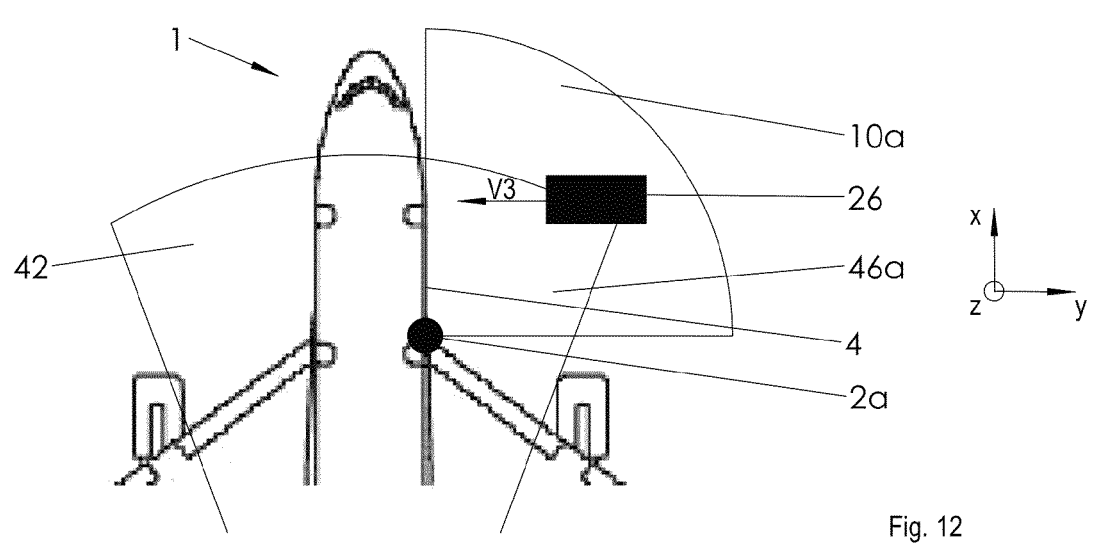

To provide a further comparison between the "actual" state and the "design" state, an indirect velocity measurement, i.e. a determination of the velocity of the vehicle 26, can be executed in parallel to the determination of separation distance, as shown in FIGS. 10, 11 and 12, by an evaluation of the optical data with the application of mathematical models. The vehicle 26 is located at the super-critical separation distance e3 and thus at least some parts of the vehicle are located in the overlap region 46a between the two registration regions 10a, 42. It is approaching the lateral fuselage section 4 at either a sub-critical velocity v1 (FIG. 10), a critical velocity v2 (FIG. 11), or a super-critical velocity v3 (FIG. 12). The determination of velocity, together with a knowledge of the vehicle weight, allows the determination of a collision impulse, and also the kinetic energy of the vehicle 26, so that based on a structural mechanics assessment the severity of a collision is determined, and a corresponding pattern of damage can be compiled, together with the repair and maintenance tasks that must be executed, if the fuselage section 4 has been subjected to an overload. The vehicle weights of the vehicles 26 that are necessary for servicing the aircraft 1 are stored as "design" data in the evaluation system. The determination as to which vehicle 26 is actually approaching takes place by means of the identification of the approaching vehicle 26 as described in FIGS. 5, 6 and 7. Each of the vehicles 26 is preferably provided with optical markings for purposes of identification of the type of vehicle; these are registered by the optical registration system and enable conclusions to be drawn regarding the vehicle weight.

The vehicle 26 is approaching at a sub-critical velocity v1 if it can still be braked ahead of the aircraft 1, and thus no collision with the aircraft 1 is to be feared. The vehicle 26 is approaching at a critical velocity v2 if a collision can no longer be prevented, but no damage occurs to the fuselage section 4. The vehicle 26 is approaching at a super-critical velocity v3 if a collision can no longer be prevented, and the type of damage calculated for the fuselage section 4 is such that an inspection of the damaged fuselage section 4 must be carried out.

Figure 13:
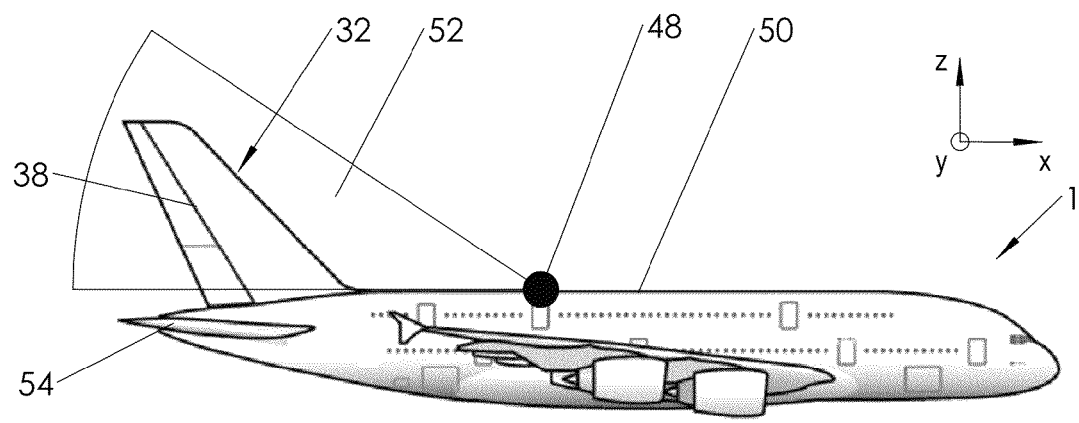
FIGS. 13 and 14 show a fourth example of embodiment of an inventive arrangement.
Figure 14:
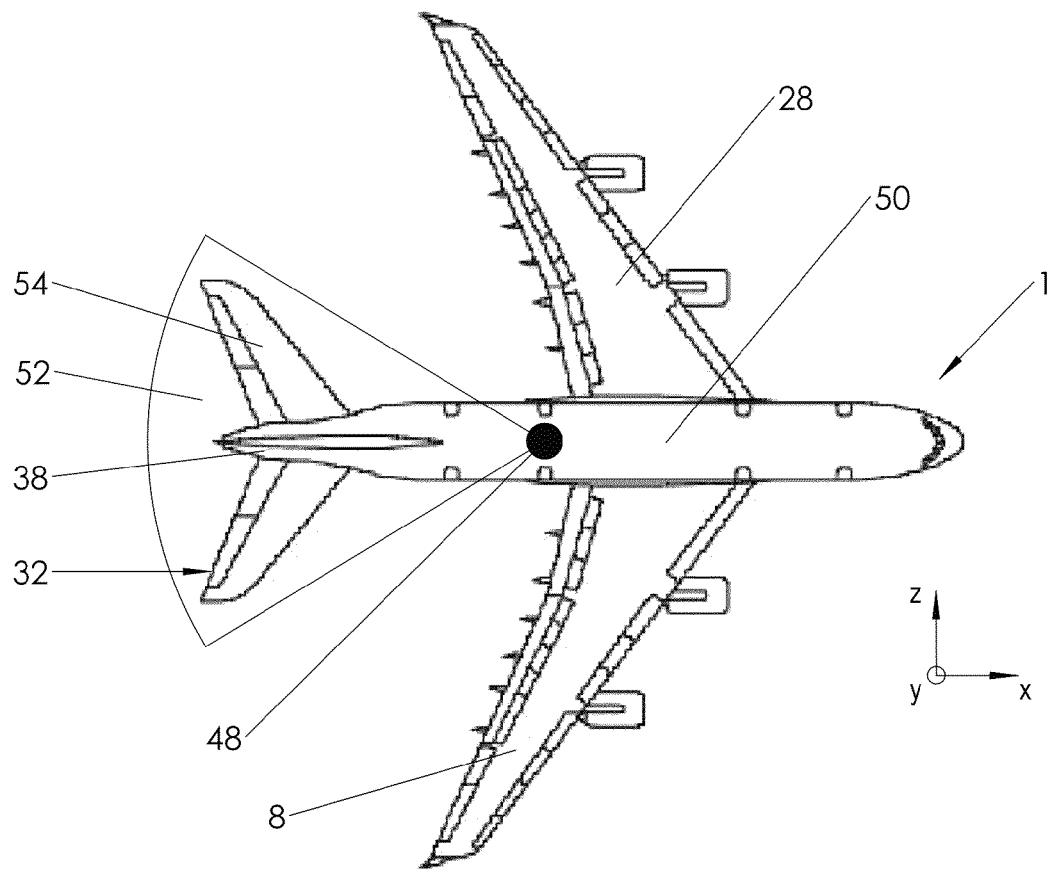

In accordance with FIGS. 13 and 14 a fourth inventive example of embodiment of an arrangement for purposes of determining an incidence of loading of a structure of an aircraft 1 has at least one optical registration system, which has one camera 48 for purposes of optical registration of the tail unit and/or the rear fuselage 32.

The optical camera 48 is positioned in the region of the fuselage 50 between the wings 8, 28, and is oriented in the direction of the tail unit 32. It defines a 3-dimensional optical registration region 52, which registers both the vertical tail unit 38 and also the elevator unit 54.

This registration system serves to record any movement and/or lateral deflection of the tail unit 32 in the transverse direction of the aircraft y. Such a movement occurs, for example, in the event of gusts, and leads to a lateral deflection of the tail unit 36, which depending on its severity can lead to an overload of the aircraft 1 in the rear region 32. If a particular level of deflection of the tail unit 32 is exceeded archiving begins and a time stamp is generated, at which the subsequent assessment begins. In this assessment, beginning at the time stamp, a real model of the tail unit is compiled from the aircraft 1, i.e. the tail unit 32, on the basis of the optical data. With the aid of a comparison of the real tail unit model with the digitised virtual tail unit model any possible deformation of the tail unit 32 is determined. In addition, the deflection is assessed in terms of the structural mechanics. A pattern of the possible damage is compiled and an inspection is prescribed, including any repair and maintenance tasks to be executed.

Figure 15:
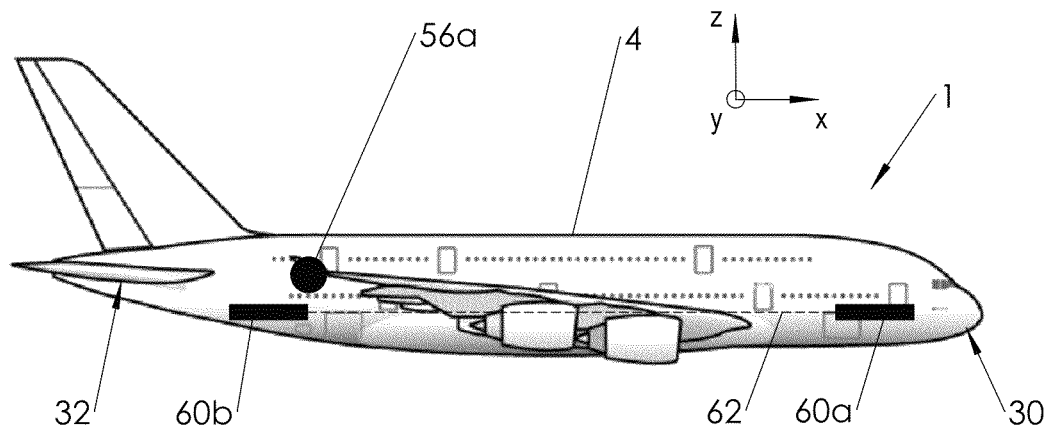
FIGS. 15 and 16 show a fifth example of embodiment of an inventive arrangement.
Figure 16:
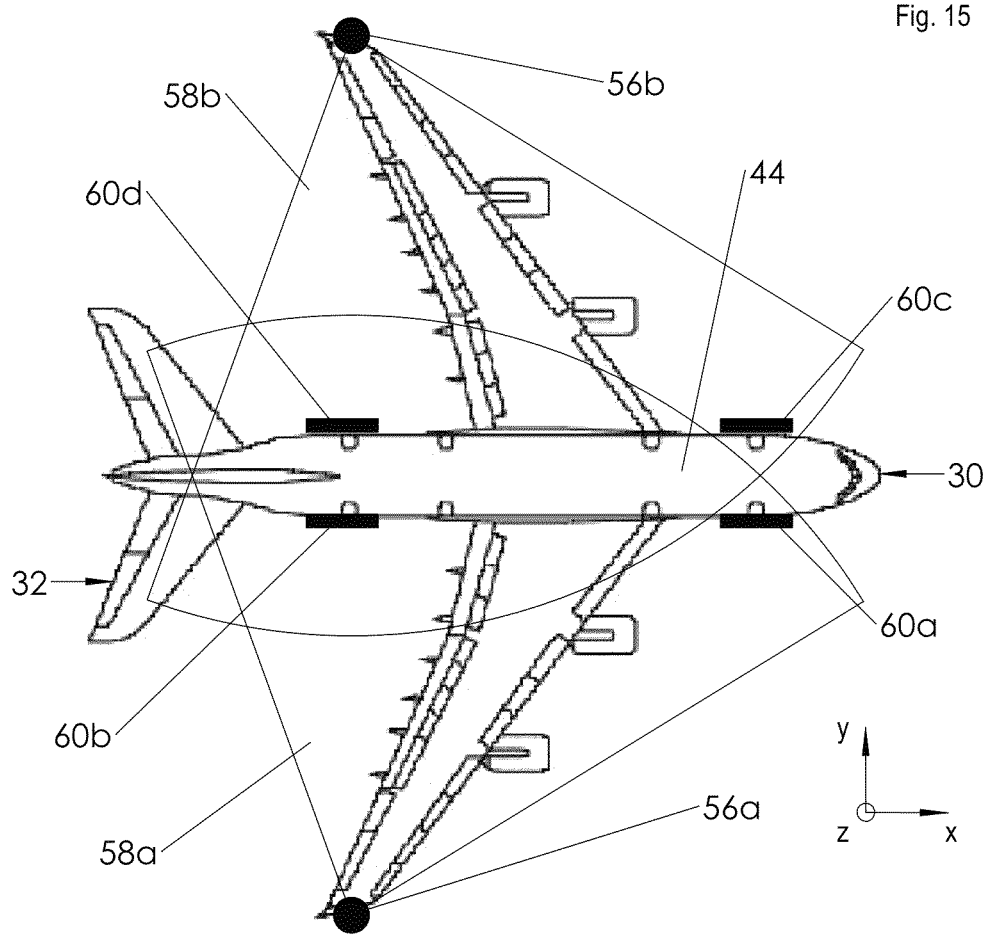

In accordance with FIGS. 15 and 16 a fifth inventive example of embodiment of an arrangement for purposes of determining an incidence of loading of a structure of an aircraft 1 has at least one optical registration system, which has two wing tip cameras 56a, 56b for purposes of optical registration of the fuselage 44.

The optical cameras 56a, 56b are oriented towards one another and in each case define a 3-dimensional registration region 58a, 58b, which widens out in the shape of a cone in the direction of the fuselage 44 and extends essentially from the cockpit 30 to the tail unit 32.

In addition this registration system has four optical markings 60a, 60b, 60c, 60d, of which one is positioned on each side of the fuselage near the cockpit and near the tail unit. The markings 60a, 60b together define an imaginary straight line or datum position 62 extending in the longitudinal direction of the aircraft x.

The registration system serves primarily to register an overload of the fuselage 44 during a landing of the aircraft 1. The markings 60a, 60b are registered by means of the cameras 56a, 56b. If a particular level of deflection of the fuselage 44 is exceeded archiving begins and a time stamp is generated, at which the subsequent assessment begins. In this assessment, beginning at the time stamp, a real model of the aircraft is compiled from the aircraft 1, i.e. the fuselage 32, on the basis of the optical data. With the aid of a comparison of the real aircraft fuselage model with the digitised virtual aircraft fuselage model any possible deformation of the fuselage 44 is determined. In addition the deflection is assessed in terms of the structural mechanics. A pattern of the possible damage is compiled and an inspection is prescribed, including any repair and maintenance tasks to be executed. Since in the course of a landing the cameras 56a, 56b alter their position relative to the straight line 62 as a result of the bending of the wings 8, 28, and thus are not defined by any definitive position relative to the markings 60a, 60b, the bending of the wings 8, 28 must also taken into account in any assessment of the deflection of the fuselage.

The inventive arrangements in accordance with FIGS. 1 to 16 are in each case fitted with an evaluation system, as indicated in FIGS. 8, 10, 16, for purposes of preparing at least one digitised virtual model of the aircraft 1 and thus a "design" state. Similarly, digitised models of the vehicles 26 necessary for the respective services undertaken on the aircraft 1, including their vehicle data, are stored in the evaluation system. In addition, the evaluation system has algorithms and/or mathematical models for purposes of executing the optical "design"-"actual" comparisons, for purposes of calculating the site of the loading incident and/or collision, for purposes of a structural mechanics assessment, for purposes of compiling the damage patterns, for purposes of issuing the repair and maintenance tasks, and also for purposes of indicating the countermeasures for purposes of avoiding or reducing the loading. Furthermore the evaluation system has a storage unit, in particular for the long-term storage or archiving of events that have led to an overload or hazard, and for storage of the incidents of structural damage that have occurred.

Moreover each of the arrangements in accordance with FIGS. 1 to 16 has a time registration system, which can be integrated into the evaluation system and with which the overload can be assigned to a time and thus to a causal entity.

Each of the arrangements in accordance with FIGS. 1 to 16 is supplemented by an acoustic registration system, which, for example, assigns a microphone to each optical camera 2a, 2b, 2c, 2d, 16a, 16b, 40, 48, 56a, 56b for the recording of noises for purposes of compiling an "actual" acoustic image. The "actual" acoustic image is compared with a stored "design" acoustic image, so that any unfamiliar alien noises are filtered out. An event causing damage, such as a collision with, for example, a fuel tanker, a freight container, a bird or similar, is then accepted as the reason for the occurrence of the alien noise in question, and archiving of the data for an evaluation begins, so that by means of this selective long-term storage on the one hand the quantity of data can be kept low. On the other hand the overwriting or deletion of optical records relevant to incidences of damage is prevented. At the same time a time stamp is assigned to the optical registration as a result of the alien noise; by means of the time stamp the damage event can be located in time and in particular a cause and/or causal entity for the damage can be determined.

If, for example, the vehicle 26 in FIGS. 7 to 12 collides with the aircraft 1, an alien noise occurs, which is filtered out by means of a "design"-"actual" comparison of the acoustic images. It is then attributed to a contact between the vehicle 26 and the aircraft 1, a time stamp is assigned to the optical monitoring record, and archiving of the data is executed. An assessment subsequently takes place, beginning, for example, at the time stamp, in which the real aircraft model after the collision is superposed with the virtual aircraft model relating to the relevant structural section. Here an investigation is undertaken as to whether any deviation exists between the real aircraft model, i.e. aircraft structural section, and the virtual aircraft model, i.e. aircraft structural section, and locally defines any such deviation. For purposes of optical registration it is also possible to identify the vehicle 26 or alien object, and thus the causal entity, on the basis of the time stamp with the aid of service records, for example, even without the markings cited in FIGS. 7, 8 and 9. Furthermore the aircraft structural section concerned is investigated in terms of the structural mechanics on the basis of available vehicle data such as weight, velocity and collision angle, as a result of which, amongst other factors, non-visible incidences of damage such as delaminations can be determined. Finally a report is generated concerning the state of the aircraft structural section and instructions such as repair measures are generated.

In addition the optical and acoustic registration systems, the determination of separation distance and determination of velocity are deployed for purposes of monitoring the aircraft 1 with regard to any incidence of trespass by a third party. This is the case, for example, if the aircraft is parked.

Disclosed is a method and an arrangement to determine an incidence of loading of an aircraft structure, wherein a true reality of at least one aircraft structural section is superposed with the virtual reality of the aircraft structural section, and any deviation is established by means of a comparison of the two realities; this deviation is evaluated with reference to its consequences in terms of the structural mechanics.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST

1 Aircraft
2a, b, c, d Camera (wing root)
4 Lateral fuselage section
6 Lateral fuselage section
8 Wing
10a, b, c, d Registration region
12 Leading edge
14 Trailing edge
16a, 16b Camera (freight door)
18 Freight door
20 Freight door
22a, b Registration region
24a, b Overlapping section
26a, b Camera (wing root)
26 Vehicle
28 Wing
30 Cockpit
32 Tail unit
34 Fuselage section
36 Fuselage section
38 Vertical tail unit
40 Camera (tail unit)
42 Registration region
44 Fuselage
46a, b, c, d Overlapping section
48 Camera (fuselage)
50 Fuselage region
52 Registration region
54 Elevator unit
56a, b Camera (wing tip)

58a, b Registration region
60a, b, c, d Marking
62 Datum position
e1 Sub-critical separation distance
e2 Critical separation distance
e3 Super-critical separation distance
v1 Sub-critical velocity
v2 Critical velocity
v3 Super-critical velocity

The invention claimed is:

1. A method for purposes of determining at least one incidence of loading of an aircraft structure comprising the steps:
    optically registering at least one section of the aircraft structure for purposes of determining an "actual" optical state of the aircraft structural section,
    comparing the "actual" optical state with a stored "design" optical state of the aircraft structural section,
    recording noises relating to at least one section of the aircraft structure for purposes of compiling an "actual" acoustic image of the aircraft structural section,
    comparing the "actual" acoustic image with a stored "design" acoustical image of the aircraft structural section,
    assessing based on structural mechanics whether an overload of at least one part of the aircraft section has occurred, and
    using an alien acoustic signal that has been determined as a starting point for the assessing step, wherein
    optical markings are provided on a side of the fuselage near the cockpit and near the tail unit, and the markings on each side of the fuselage together define an imaginary straight line extending in a longitudinal direction of the aircraft.

2. The method in accordance with claim 1, including the step of using a digitized model of the aircraft structural section as the "design" state, and compiling a real model on the basis of the registered data as the "actual" state.

3. The method in accordance with claim 1, including the step of registering a time of occurrence of the loading incident.

4. The method in accordance with claim 1, including the step of determining a velocity and a separation distance of an alien object relative to the aircraft.

5. An arrangement for executing the method in accordance with claim 1, comprising:
    an optical registration system arranged to register at least one section of the aircraft structure by generating optical registration data, the optical registration system having optical marking on a side of the fuselage near the cockpit and near the tail unit, and the markings on each side of the fuselage together define an imaginary straight line extending in a longitudinal direction of the aircraft,
    an evaluation system arranged to identify at least one overload of at least one aircraft structural section on the basis of the optical registration data of the optical registration system.

6. The arrangement in accordance with claim 5, including an acoustic registration system arranged to provide an acoustic registration of the loading incident.

7. The arrangement in accordance with claim 5, including a time registration system arranged to provide an assignment of a time to the loading incident.

* * * * *